(12) United States Patent
Polychronis

(10) Patent No.: US 11,860,717 B1
(45) Date of Patent: Jan. 2, 2024

(54) GRAPHICAL USER INTERFACE FOR PRESENTING CRASH DATA

(71) Applicant: Splunk Inc., San Francisco, CA (US)

(72) Inventor: Konstantinos Polychronis, San Francisco, CA (US)

(73) Assignee: Splunk Inc., San Francisco, CA (US)

( * ) Notice: Subject to any disclaimer, the term of this patent is extended or adjusted under 35 U.S.C. 154(b) by 0 days.

(21) Appl. No.: 17/963,637

(22) Filed: Oct. 11, 2022

Related U.S. Application Data

(63) Continuation of application No. 17/459,163, filed on Aug. 27, 2021, now Pat. No. 11,500,709, which is a continuation-in-part of application No. 16/526,586, filed on Jul. 30, 2019, now Pat. No. 11,194,647, which is a continuation of application No. 15/663,513, filed on Jul. 28, 2017, now Pat. No. 10,409,668, which is a continuation of application No. 14/697,427, filed on Apr. 27, 2015, now Pat. No. 9,747,152.

(51) Int. Cl.
*G06F 11/07* (2006.01)

(52) U.S. Cl.
CPC ........ *G06F 11/0769* (2013.01); *G06F 11/079* (2013.01); *G06F 11/0742* (2013.01)

(58) Field of Classification Search
CPC . G06F 11/0769; G06F 11/0742; G06F 11/079
See application file for complete search history.

(56) References Cited

U.S. PATENT DOCUMENTS

| | | | |
|---|---|---|---|
| 6,961,874 B2 | 11/2005 | Lodrige | |
| 7,319,661 B1 | 1/2008 | Bohossian et al. | |
| 7,409,595 B2 | 8/2008 | Nissan-messing et al. | |
| 7,673,027 B2 * | 3/2010 | Janakiraman | G06F 8/20 |
| | | | 709/217 |
| 8,381,189 B2 | 2/2013 | Surazski et al. | |
| 8,660,952 B1 | 2/2014 | Viera et al. | |
| 9,436,533 B2 | 9/2016 | Hermany et al. | |
| 2013/0061091 A1 | 3/2013 | Moore et al. | |
| 2014/0024348 A1 | 1/2014 | Hurst et al. | |
| 2016/0098697 A1 | 4/2016 | Dunsmore et al. | |

* cited by examiner

*Primary Examiner* — Joseph R Kudirka
(74) *Attorney, Agent, or Firm* — Shook, Hardy & Bacon L.L.P.

(57) ABSTRACT

Various methods and systems for tracking incomplete purchases in correlation with application performance, such as application errors or crashes, are provided. In this regard, aspects of the invention facilitate monitoring transaction and application error events and analyzing data associated therewith to identify data indicating an impact of incomplete purchases in relation to an error(s) such that application performance can be improved. In various implementations, application data associated with an application installed on a mobile device is received. The application data is used to determine that an error that occurred in association with the application installed on the mobile device correlates with an incomplete monetary transaction initiated via the application. Based on the error correlating with the incomplete monetary transaction, a transaction attribute associated with the error is determined.

20 Claims, 7 Drawing Sheets

US 11,860,717 B1

GRAPHICAL USER INTERFACE FOR PRESENTING CRASH DATA

CROSS-REFERENCE TO RELATED APPLICATIONS

This application is a continuation of U.S. patent application Ser. No. 17/459,163 filed Aug. 27, 2021, now issued as U.S. Pat. No. 11,500,709, which itself is a continuation of U.S. patent application Ser. No. 16/526,586 filed Jul. 30, 2019, and issued as U.S. Pat. No. 11,194,647, which is itself a continuation of U.S. patent application Ser. No. 15/663,513, filed Jul. 28, 2017, and issued as U.S. Pat. No. 10,409,668, which itself is a continuation of U.S. patent application Ser. No. 14/697,427, filed Apr. 27, 2015, and issued as U.S. Pat. No. 9,747,152, the entire contents of each are incorporated herein by reference.

BACKGROUND

With the advancement of mobile applications, consumers are increasingly making purchases or transactions via their mobile devices. For instance, a consumer might purchase an item or complete a money transfer via a mobile application that provides shopping or banking functionality. Unfortunately, in attempting to complete transactions via a mobile application, the application may crash such that the transaction is not completed. Such application errors occurring during an attempt to complete a transaction can result in a monetary impact to the provider of the application. For example, due to an application error, a consumer may lose items previously included in his or her electronic shopping cart. Rather than the consumer subsequently replacing the items in the shopping cart, however, the consumer may decide to forego the purchase resulting in a lost monetary opportunity for the provider of the mobile application. As another example, repetitive incomplete money transfers associated with a banking application may result in a consumer utilizing another banking application. As such, these missed monetary opportunities due to application interruptions, such errors and crashes, can greatly impact the entity providing the application, particularly when an error(s) occurs frequently.

SUMMARY

Embodiments of the present invention provide methods and systems for tracking incomplete transactions in correlation with application performance, such as application errors or crashes. In this regard, aspects of the invention facilitate monitoring transaction events and application errors occurring at a mobile device to capture data associated therewith. The captured data can be analyzed to correlate incomplete transactions with application errors. In this way, transaction data, such as a monetary amount or items, associated with an incomplete transaction (e.g., incomplete purchase) can be identified in connection with an application error(s) and provided to an application developer. The application developer can then use the information related to incomplete transactions corresponding with application errors to, for example, prioritize debugging errors associated with the application. For instance, the application developer may choose to dedicate resources to debugging an error associated with a largest number of incomplete transactions.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Figure 1:
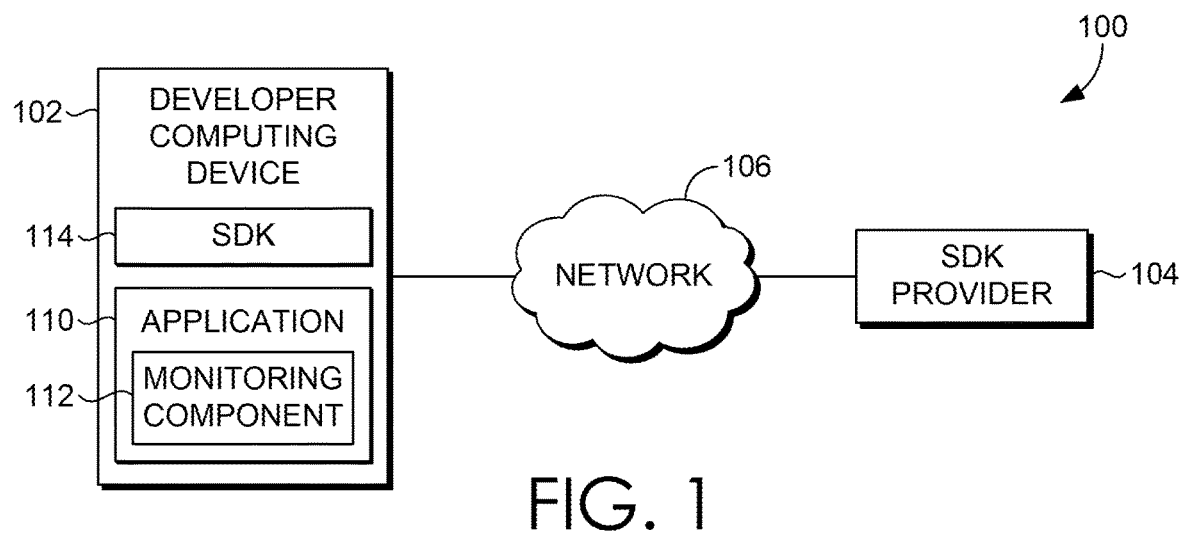
FIG. 1 is a block diagram showing a system for developing an application that includes monitoring functionality, in accordance with embodiments of the present invention.

The subject matter of embodiments of the invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b).

Incomplete purchases can be monitored in an effort to gain valuable insight as to monetary loss related to an application running on a client device. In this regard, conventional systems can track items placed in an electronic shopping cart but not ultimately purchased by the consumer. In some cases, however, an application may crash before an item is ultimately purchased and, due to the application crash, data is not captured. Application errors occurring during an attempt to complete a transaction can result in a monetary impact to the provider of the application. For example, a consumer may lose items previously included in his or her electronic shopping cart. Rather than the consumer subsequently replacing the items in the shopping cart, however, the consumer may decide to forego the purchase resulting in a lost monetary opportunity for the provider of the mobile application. As another example, repetitive incomplete money transfers associated with a banking application may result in a consumer utilizing another banking application. As such, these missed monetary opportunities due to application interruptions, such errors and crashes, can greatly impact monetary gain to the entity providing the application, particularly when an error(s) occurs frequently.

Embodiments of the present invention provide methods and systems for tracking incomplete purchases in correlation with application performance, such as application errors or crashes. In this regard, aspects of the invention facilitate monitoring transaction events and application errors at a mobile device to capture data associated therewith. The captured data can be analyzed to correlate incomplete transactions with application errors. In this regard, transaction data, such as a monetary amount or items, associated with an incomplete purchase can be identified in connection with an application error(s) and provided to an application developer. The application developer can then use the information related to incomplete transactions corresponding with application errors to, for example, prioritize debugging errors associated with the application. For instance, the application developer may choose to dedicate resources to debugging an error associated with a largest number of incomplete transactions.

Analysis to correlate incomplete transactions with application errors might be performed by an analytics service, such as the SPLUNK® ENTERPRISE system produced by Splunk Inc. of San Francisco, California, or any other backend service. The SPLUNK® ENTERPRISE system generally uses an event-based system to store and process data. The SPLUNK® ENTERPRISE system is the leading platform for providing real-time operational intelligence that enables organizations to collect, index, and harness machine-generated data from various websites, applications, servers, networks, and mobile devices that power their businesses. The SPLUNK® ENTERPRISE system is particularly useful for analyzing unstructured performance data, which is commonly found in system log files. Although an event-based system is generally referred to, the techniques are also applicable to other types of systems.

In the SPLUNK® ENTERPRISE system, performance data is stored as "events," wherein each event comprises a collection of performance data and/or diagnostic information that is generated by a computer system and is correlated with a specific point in time. Events can be derived from "time series data," wherein time series data comprises a sequence of data points (e.g., performance measurements from a computer system) that are associated with successive points in time and are typically spaced at uniform time intervals. Events can also be derived from "structured" or "unstructured" data. Structured data has a predefined format, wherein specific data items with specific data formats reside at predefined locations in the data. For example, structured data can include data items stored in fields in a database table. In contrast, unstructured data does not have a predefined format. This means that unstructured data can comprise various data items having different data types that can reside at different locations. For example, when the data source is an operating system log, an event can include one or more lines from the operating system log containing raw data that includes different types of performance and diagnostic information associated with a specific point in time. Examples of data sources from which an event may be derived include, but are not limited to: web servers; application servers; databases; firewalls; routers; operating systems; and software applications that execute on computer systems, mobile devices, and sensors. The data generated by such data sources can be produced in various forms including, for example and without limitation, server log files, activity log files, configuration files, messages, network packet data, performance measurements, and sensor measurements. An event typically includes a timestamp that may be derived from the raw data in the event, or may be determined through interpolation between temporally proximate events having known timestamps.

The SPLUNK® ENTERPRISE system also facilitates using a flexible schema to specify how to extract information from the event data, wherein the flexible schema may be developed and redefined as needed. Note that a flexible schema may be applied to event data "on the fly," when it is needed (e.g., at search time), rather than at ingestion time of the data as in traditional database systems. Because the schema is not applied to event data until it is needed (e.g., at search time), it is referred to as a "late-binding schema."

During operation, the SPLUNK® ENTERPRISE system starts with raw data, which can include unstructured data, machine data, performance measurements, or other time-series data, such as data obtained from weblogs, syslogs, or sensor readings. It divides this raw data into "portions," and optionally transforms the data to produce timestamped events. The system stores the timestamped events in a data store, and enables a user to run queries against the data store to retrieve events that meet specified criteria, such as containing certain keywords or having specific values in defined fields. Note that the term "field" refers to a location in the event data containing a value for a specific data item.

As noted above, the SPLUNK® ENTERPRISE system facilitates using a late-binding schema while performing queries on events. A late-binding schema specifies "extraction rules" that are applied to data in the events to extract values for specific fields. More specifically, the extraction rules for a field can include one or more instructions that specify how to extract a value for the field from the event data. An extraction rule can generally include any type of instruction for extracting values from data in events. In some cases, an extraction rule comprises a regular expression, in which case the rule is referred to as a "regex rule."

In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as an analyst learns more about the data in the events, the analyst can continue to refine the late-binding schema by adding new fields, deleting fields, or changing the field extraction rules until the next time the schema is used by a query. Because the SPLUNK® ENTERPRISE system maintains the underlying raw data and provides a late-binding schema for searching the raw data, it enables an analyst to investigate questions that arise as the analyst learns more about the events.

In the SPLUNK® ENTERPRISE system, a field extractor may be configured to automatically generate extraction rules for certain fields in the events when the events are being created, indexed, or stored, or possibly at a later time. Alternatively, a user may manually define extraction rules for fields using a variety of techniques.

Also, a number of "default fields" that specify metadata about the events rather than data in the events themselves can be created automatically. For example, such default fields can specify: a timestamp for the event data; a host from which the event data originated; a source of the event data; and a source type for the event data. These default fields may be determined automatically when the events are created, indexed or stored.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by different data sources, the system facilitates use of a "common information model" (CIM) across the different data sources.

In accordance with embodiments of the present invention, transaction events and/or application errors are monitored at a mobile device. FIG. 1 illustrates an exemplary computing environment 100 for developing an application that includes monitoring functionality, in accordance with embodiments of the present invention. The environment 100 is an example of one suitable environment. The environment 100 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the infrastructure.

The environment 100 may include developer computing device 102, SDK provider 104, and network 106. The network 106 may include, without limitation, one or more local area networks (LANs) and/or wide area networks (WANs). Such networking environments are commonplace in offices, enterprise-wide computer networks, intranets and the Internet. Accordingly, the network 106 is not further described herein.

Any number of developer computing devices and SDK providers may be employed in the environment 100 within the scope of embodiments of the present invention. Each may comprise a single device/interface or multiple devices/interfaces cooperating in a distributed environment. For instance, the developer computing device 102 may comprise multiple devices and/or modules arranged in a distributed environment that collectively provide the functionality of providing content to client devices. Additionally, other components/modules not shown also may be included within the environment 100.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. In particular, other arrangements may support scalable implementations of embodiments of the present invention. The infrastructure 100 can be scalable to support the ability to be enlarged to accommodate growth.

Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 2:
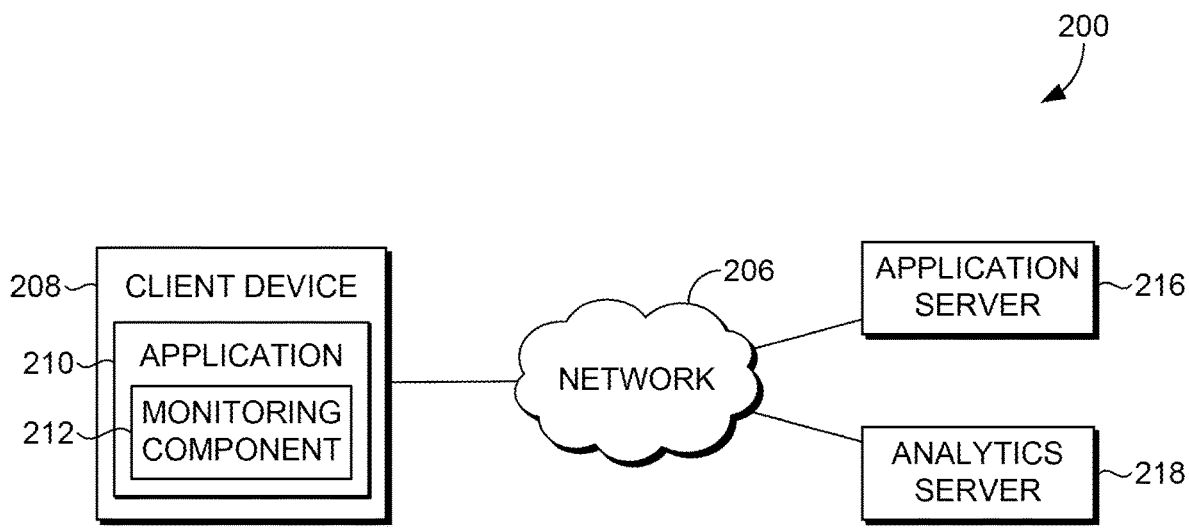
FIG. 2 is a block diagram showing a system for facilitating tracking incomplete purchases in correlation with application errors, in accordance with embodiments of the present invention.

The developer computing device 102 is configured for use in developing or generating an application(s) that can be distributed to various client devices, such as client device 208 of FIG. 2. In this manner, a developer can utilize the developer computing device 102 to develop application 110. An application refers to a computer program that enables content to be provided to a user. An application may be a mobile application or any other application that is executable via a client device. An application can provide or be related to any type of content, such as, for example, email, stock market, sports, social networking, games, merchandise, banking, investing, shopping, or any other content including a potential transaction that might be initiated, etc.

In accordance with embodiments described herein, the application 110 incorporates or includes a monitoring component 112. At a high level, the monitoring component 112 is a software component that facilitates monitoring events, such as transaction events and/or performance events, when the application is installed on a client device. In embodiments, the monitoring component 112 is a plug-in, extension, or add-on (generally referred to herein as a plug-in). A plug-in refers to a software component that adds a specific feature or set of features to an existing software application or a software application being developed. An application that supports plug-ins can enable customization of the application.

In some embodiments, the monitoring component 112 can operate using a set of custom monitoring classes that facilitate event monitoring. A set of custom monitoring classes are executable code of the monitoring component that support monitoring events. A class refers to an extensible program-code-template for creating objects, providing initial values for state, and implementations of behavior. In this way, a class is a template or pattern in code that defines methods to generate a particular object and behaviors thereof. A custom class refers to a class that is customized or generated to perform a specific functionality that may be unique from a default or native class. A default or native class refers to a class originally developed for implementation. A default or native class may be designed by, for instance, a platform on which an application may run, such as Android™, iOS®, and Windows Phone®, to name a few. A custom monitoring class is a class that is customized or generated to facilitate performance of a monitoring aspect as described herein.

It is contemplated that custom monitoring classes can be incorporated in the application 110 as a monitoring component or plug-in via a software development kit (SDK), for instance. In such a case, a software development kit (SDK) 114 can be downloaded, for example, from SDK provider 104 via network 106. Although FIG. 1 illustrates a SDK provider 104 to provide SDK 114 to the developer computing device 102, it can be appreciated that any other means can be used to obtain an SDK at the developer computing device 102.

The SDK 114 can include the custom monitoring classes that can be incorporated into the application 110 as the monitoring component 112. In this manner, a custom class or set of custom classes can be provided (e.g., via a library)

through a software development kit (SDK) environment in which the developer of the application 110 writes the corresponding code. When the code is converted to an executable application, the set of custom classes can become part of the application itself. In some cases, a custom class or set of custom classes are generated and offered (e.g., via an SDK) by a developer or provider of an analytics service, such as a service provided by analytics server 218 of FIG. 2. In such cases, the analytics service provider can use custom classes to facilitate or control monitoring of events to identify transaction and/or performance events that can be used to analyze transaction impacts based on application errors or crashes.

In embodiments, the custom monitoring classes can be incorporated into the application 110 via code that calls the monitoring component 112. In this regard, custom monitoring classes can become accessible via a library, for example. As such, using the developer computing device 102, a developer of the application 110 can add code into the application code that is used to trigger the monitoring component 112 (e.g., set of custom monitoring classes) during execution of the application. Code that triggers the monitoring component may be referred to herein as a monitor trigger. Code triggering the monitoring component 112 may be added or incorporated into any aspect of the application code. For instance, a monitor trigger may be included at or near the beginning of the executable code of the application 110 such that the monitoring component 112 is initiated or triggered as the application is launched or started.

By way of example only, and without limitation, a developer using the developer computing device 102 to develop an application may download an SDK that facilitates monitoring of events in association with the application. The SDK may be downloaded from a provider of an analytics service, such as a provider associated with analytics server 218 of FIG. 2 that analyzes data to report transaction impact associated with application performance (e.g., errors or crashes). The SDK may include monitoring operations, including a set of custom monitoring classes that, in implementation, facilitate monitoring of events at client devices. To call the monitoring operations or functionality during execution of the application at a client device, the developer may provide a monitor trigger within the code of the application. For example, a monitor trigger may be provided at the initialization of the application such that the monitoring component is called as the application is opened, activated, logged into, or initialized at a client device. The developer operating the developer computing device 102 can then make the application executable such that the application, along with the monitoring component associated therewith, can be downloaded and executed at client devices.

U.S. application Ser. No. 14/524,748, filed, Oct. 27, 2014, titled "Utilizing Packet Headers to Monitor Network Traffic in Association with a Client Device," describes utilization of custom classes provided via a SDK, which is herein incorporated by reference. As can be appreciated, the application 110 incorporating monitoring operations can be generated or developed in any manner and is not intended be limited to embodiments described herein (e.g., use of custom classes provided via a SDK). For example, although an SDK might create and send collected data, embodiments are not limited to any specific SDK. As another example, an SDK, or portion thereof, is not needed to capture and/or send data to an analysis service. For example, in some cases, a developer using the developer computing device 102 can independently generate the application with monitoring operations using any programming means (e.g., without use of an SDK).

Upon developing the application 110 that incorporates monitoring operations, via monitoring component 112, the application can be distributed to various client devices, such as client device 208 of FIG. 2. Applications can be distributed to client devices in any manner. In some cases, the application may be distributed to a client device directly from the developer computing device 102. In other cases, the application may be distributed to a client device via an application marketplace or other application distribution system. For instance, an application marketplace or other application distribution system might distribute the application to a client device based on a request from the client device to download the application.

Turning now to FIG. 2, an example analytics infrastructure ("infrastructure") 200, in which embodiments of the present invention may be performed, is shown. The infrastructure 200 is an example of one suitable infrastructure. The infrastructure 200 should not be interpreted as having any dependency or requirement related to any single module/component or combination of modules/components illustrated therein. Each may comprise a single device or multiple devices cooperating in a distributed environment. For instance, components may comprise multiple devices arranged in a distributed environment that collectively provide the functionality described herein. Additionally, other components not shown may also be included within the infrastructure.

The infrastructure 200 may include client device 208, application server 216, analytics server 218, and network 206. The network 206 may include, without limitation, one or more local area networks (LANs) and/or wide area networks (WANs). Such networking environments are commonplace in offices, enterprise-wide computer networks, intranets and the Internet. Accordingly, the network 206 is not further described herein.

Any number of client devices, application servers, and analytics servers may be employed in the infrastructure 200 within the scope of embodiments of the present invention. Each may comprise a single device/interface or multiple devices/interfaces cooperating in a distributed environment. For instance, the application server 216 may comprise multiple devices and/or modules arranged in a distributed environment that collectively provide the functionality of providing content to client devices. Similarly, the analytics server 218 may comprise multiple devices and/or modules arranged in a distributed environment that collectively provide the functionality of performing analytics. Additionally, other components/modules not shown also may be included within the infrastructure 200.

It should be understood that this and other arrangements described herein are set forth only as examples. Other arrangements and elements (e.g., machines, interfaces, functions, orders, and groupings of functions) can be used in addition to or instead of those shown, and some elements may be omitted all together. In particular, other arrangements may support scalable implementations of embodiments of the present invention. The infrastructure 200 can be scalable to support the ability to be enlarged to accommodate growth.

Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The client device 208 may include any type of computing device, such as computing device 700 described below with reference to FIG. 7, for example. The client device 208 might take on a variety of forms, such as a personal computer (PC), a laptop computer, a mobile phone, a smartphone, a smartwatch, a tablet computer, a wearable computer, a personal digital assistant (PDA), a server, an MP3 player, a global positioning system (GPS) device, a video player, a handheld communications device, a workstation, any combination of these delineated devices, or any other suitable device. Generally, the client device 208 can provide access to different content, for instance, content provided via various applications, such as application 210. In this regard, content can be provided to the client device 208 from an application server (e.g., application server 214) accessible via a network (e.g., network 206) such as the Internet or a private local area network.

As illustrated in FIG. 2, the client device 208 has application 210 installed thereon. The application 210 can be obtained from an application developer, such as developer computing device 102 of FIG. 1. In other cases, the application may be obtained via an application marketplace or other application distribution system. For instance, the client device 208 might download application 210 from an application marketplace or other application distribution system.

The application, via the client device 208, communicates with the application server 216 to exchange information (e.g., content, data, etc.) therebetween. The application server 216 is generally configured to store, process, and deliver content to client devices, such as client device 208. The communication between client device 208 and the application server 216 may take place using, for example, the Hypertext Transfer Protocol (HTTP) or Hypertext Transfer Protocol Secure (HTTPS). Content delivered from the application server 216 to the client device 208 might be HTML documents, which may include images, style sheets and scripts in addition to text content. Any other type of content (e.g., audio, video, etc.) is contemplated within the scope of embodiments of the present invention, and HTML documents are provided only as an example. As can be appreciated, in addition to delivering content to client devices, various request and response packets can also be communicated between client devices and the application server. For example, generally, an application residing on a client device initiates communication with a corresponding application server by making a request for a specific resource (e.g., using HTTP), and the application server responds with the appropriate content.

In accordance with embodiments described herein, generally, content delivered from the application server 216 includes content associated with a transaction or purchase of an item, such as a monetary transaction. For example, in some cases, content may include indications of items that may be purchased or content enabling a money transfer (e.g., via a banking or investing application). A transaction generally refers to an exchange or interaction, generally associated with payment. A transaction may be a purchase of an item or another exchange of money, for example. An incomplete transaction is a transaction that has been initiated but is not completed or finished.

With reference to the application 210 running on the client device 208, the application 210 includes a monitoring component 212, such as a plug-in, that is used to facilitate monitoring events, such as transaction events and/or performance events, in association with the application 210. In this regard, the monitoring component 212 may utilize classes, such as custom monitoring classes, to implement monitoring of events associated with the application 210.

The monitoring component 212 may be incorporated into the application 210 in any number of ways. The method employed to incorporate or provide the network monitor described herein is not intended to limit the scope of embodiments of the present invention. Further, although the monitoring component 212 is generally described herein as being incorporated into the application 210, as can be appreciated, such monitoring may operate independent of an application or set of applications for which events are being monitored. For example, the monitor described herein may be implemented as a stand-alone application (e.g., on the client device or remote therefrom) in communication with the application 210.

At a high-level, the monitoring component 212 facilitates monitoring events associated with the application 210 running on the client device 208. In particular, transaction events and/or performance events are monitored and identified. Transaction events refer to events related to a transaction or purchase. Transaction events may include, for example, adding an item into a shopping cart, selecting a purchase icon, receiving transaction input (e.g., credit card information), presentation of shipping costs, presentation of taxes, presentation of total costs, etc. Performance events refer to events related to performance of the application. By way of example, and not limitation, a performance event may be an application error, an application crash, an application version, etc. Monitoring events enables application data to be gathered corresponding with performance and/or transactions associated with an application or set of applications. Upon obtaining application data associated with the application, the application data can be provided to the analytics server 218 for analyzing incomplete transactions correlated with the application performance, as described in more detail below.

In one implementation, monitoring component 212 is invoked upon launching the application 210. The application 210 may be launched or invoked in any manner, such as, for example, upon user selection of the application 210 via an interface of the client device 208 or completion of user login to the application. As another example, application 210 might be remotely launched (e.g., via a remote computer) by a developer or an administrator to cause monitoring. In accordance with initiating execution or login of the application 210, the monitoring component 212 may be triggered or initiated. By way of example, and without limitation, monitor trigger code may be included in the application 210 to call the monitoring component 212. In this regard, when the instructions in the application program call or reference the monitoring component 212, such as a monitoring plug-in, during run time of the application 210 at the client device 208, the monitoring component 212 is triggered or initiated. For instance, a monitoring plug-in may be initiated at start up, login, or initialization of the application 210 via a single line of code invoking such a plug-in. In some cases, the monitoring component 212 may run in parallel or concurrent with other functionality provided by the application 210 in which the monitoring component 212 is incorporated.

In accordance with initiating the monitoring component 212, such as a monitoring plug-in, a unique session identifier can be created for a session including a series of events. In some embodiments, the session identifier can be used to correlate performance data (e.g., an error or crash of the application) with transaction data (e.g., data associated with an incomplete purchase). A session may terminate in any number of instances, and is not intended to be limited to sessions described herein. For example, in some cases, a session may terminate upon an error or crash occurring in connection with the application. In this regard, application data created between the session initialization (e.g., start initialization of the plug-in) and an application crash are associated with the same designated session identifier. Other examples of sessions terminating include closing the application, logging out of the application, a new initialization of the application, or as otherwise designated by an application developer.

In accordance with the monitoring component 212 being initiated at the client device 208, the monitoring component 212 can listen for or detect events, such as transaction events and/or performance events. As described, a transaction event refers to any functionality designated as being associated with or corresponding to a transaction. Such a transaction may be a monetary purchase, a monetary exchange, or other exchange for which data is desired to be captured. A transaction event can be detected, for example, in connection with a user selection or interaction with a transaction indicator, such as selection of a purchase icon, selection to add an item to an electronic shopping cart, selection to begin a transaction (e.g., purchase or electronic monetary transfer), selection related to shipping, input of credit card or other payment information, or the like. Other examples of transaction events can include presentation of shipping costs, presentation of total costs, presentation of taxes, presentation of discounts/coupons, etc. In embodiments, any number of lines of code within the application (e.g., via SDK or otherwise) can be used to listen for or detect various events. For example, a provider of one application may wish to detect a first and second transaction event, while a provider of another application may wish to detect a third and fourth transaction event. As such, each provider can implement such event listeners in the code as appropriate. For instance, an extra line of code may be included to recognize that when a user selects a "add item to shopping cart" button, an event is logged. In such a case, upon detecting a user selected a "add item to shopping cart" button, an indication of the transaction event can be logged, e.g., as Mint.purchaseBegin (itemID, cost). Other code can be included to recognize that when a user selects a "purchase" button, an event is logged. In this scenario, upon detecting a user selection of a "purchase" button, an indication of the transaction event can be logged, e.g., as Mint.purchaseComplete(itemID, cost). As can be appreciated, the event log may contain other events, including events occurring before, between, and/or after these example events described.

In accordance with detecting a transaction event, data associated with the transaction event, namely, transaction data, can be identified and/or captured. Transaction data refers to any data associated with a transaction or potential transaction (e.g., transaction in progress). By way of example only, and not limitation, transaction data may be an item identifier that identifies an item desired to be purchased, a monetary amount associated with an item desired to be purchased, a number of items desired to be purchased, a total monetary amount associated with items desired to be purchased, shipping costs, time of event, or the like.

In some embodiments, the monitoring component 212 can additionally or alternatively listen for or detect a performance event(s). A performance event refers to an event associated with performance of the application. As described herein, a performance event is generally related to an error or crash associated with an application. In this regard, when the application being monitored incurs an error or a crash, a performance event is detected. In accordance with detecting a performance event, data associated with the performance event, namely, performance data, can be identified and/or captured. Performance data refers to any data associated with performance of the application. As examples, and without limitation, performance data may be an error or crash identifier (generally referred to herein as an error identifier) that identifies the type of error that occurred in connection with the application, a version identifier that identifies the version of the application, an application identifier that identifies the specific application, a time the error occurred, a geographical location of the client device at the time of the error, or the like. In this regard, an occurrence of an error may result in or correspond with, for example, information about the user, the application, and/or the user device.

The application data, such as transaction data and/or the performance data, can be captured, for example, in an event log that logs data associated with the transaction and/or performance events. As can be appreciated, a single event log can be used to capture both the transaction data and the performance data. In other embodiments, separate event logs can be used to capture the transaction data and the performance data. A session identifier identifying a session can also be included in the event log in connection with the transaction data and/or performance data.

Upon obtaining application data in association with the application 210, the application data can be stored (e.g., via an event log) at the client device 208 and/or communicated to the analytics server 218 for processing. Alternatively or additionally, data processing may occur at the client device 208. As can be appreciated, the application data can be stored at the client device 208 and communicated to an analytics server 218 at any time, such as immediately, upon a time delay, in accordance with an occurrence of an event, etc. For instance, application data, such as transaction data and/or purchase data (e.g., in the event log), may be sent at the end or completion of a session, upon the occurrence of a performance event (e.g., an application crash), upon initialization of the application after an occurrence of a performance event (e.g., application crash), upon collecting a particular amount of data (e.g., 150 kilobytes of data), upon initialization of the application (e.g., communicate data collected in previous session), in real-time in accordance with collecting the data, or the like. In some cases, collected information may be transformed to JSON objects at the client device 208 and/or the analytics server 218 for use in processing the data.

As can be appreciated, although the monitoring component 212 is described herein as detecting transaction and performance data and collecting data associated therewith, it can be appreciated that such functionality may be performed by multiple components or separate components. For instance, a first monitoring component might monitor transaction events and capture data associated therewith, while a second monitoring component might monitor performance data and capture data associated therewith. Such data might be aggregated or communicated separately to an analytics server for processing.

The analytics server 218 facilitates the discovery and communication of meaningful patterns in data. In particular, the analytics server 218 may operate with additional components and modules in the infrastructure 200 to perform analytics based on monitored application data. In accordance with aspects of the present invention, the analytics server 218 can obtain various types of data, including application data identified and captured at various client devices. Such data can be analyzed and used to provide, determine, or calculate transaction impact or attributes based on application performance (e.g., errors). To this end, various application data captured at client devices can be communicated to the analytics server 218 at which transaction attributes can be calculated therefrom.

A transaction attribute refers to a characteristic, quality, or feature used to indicate or measure some component of data related to a transaction or set of transactions (e.g., an incomplete transaction or purchase) corresponding or associated with application performance (e.g., an application error). A transaction refers to an exchange or interaction, generally associated with payment. An incomplete transaction is a transaction that has been initiated but not completed. As described in more detail below, transaction attributes are determined to provide information related to an incomplete transaction or set of incomplete transactions corresponding with an application error(s). In embodiments, a transaction attribute indicates a transaction impact or purchase impact associated with an error of an application. By way of example, and without limitation, a transaction attribute may be an item identifier(s) identifying a specific item(s) associated with an incomplete purchase, an amount of money associated with an item or set of items for an incomplete purchase, a number of items associated with an incomplete purchase, an error identifier identifying an error associated with an incomplete transaction, a quantity of errors (e.g., a specific type of error) associated with incomplete transactions within a time period, a location(s) associated with incomplete transaction(s), a version of an application associated with incomplete transaction(s), a type of device associated with incomplete transaction(s), etc.

In embodiments, to determine transaction attributes, the analytics server 218 may initially receive application data. For example, application data associated with an application installed on a mobile device can be provided to the analytics server 218, as described above. Such data may include transaction data, performance data, and/or a session identifier. Application data can be stored in association with the analytics server 218 such that the data is accessible by the analytics server 218 for analyzing the data. As can be appreciated, application data can be provided from any number of client devices and in any number of manners. For instance, a first set of application data might be provided from a first mobile device upon an application crash occurring at the first mobile device, and a second set of application data might be provided from a second mobile device upon an application crash at the second mobile device.

The application data can be referenced and used to determine that an application error correlates with an incomplete transaction. That is, the application data can be used to identify that an error that occurred in association with the application, such as application 210 installed on the device 208, correlates with an incomplete transaction (e.g., monetary transaction) initiated via the application. Application data used to make such a determination can be performance data, transaction data, and/or a session identifier. In embodiments, a session identifier can be used to associate performance data (e.g., an error) with transaction data (e.g., incomplete transaction).

A determination of whether an application error correlates with an incomplete transaction can be performed in a number of manners and is not intended to be limited to examples provided herein. In one implementation, a correlation can be recognized by initially identifying an incomplete transaction(s). One exemplary method used to identify an incomplete transaction is to identify an initialization of a transaction event that is not associated with a completion of the transaction. For instance, assume that an event log is used to capture transaction events identified by code running on a client device. Such events being monitored and captured may include, e.g., selection of an "add to shopping cart" button, selection of a "purchase" button, presentation of shipping costs, etc. The event log, or portion thereof, can be searched to determine if a transaction event initiated, as indicated by Mint.purchaseBegin(itemID, cost), for example, is followed by a completion of the transaction, as indicated by Mint.purchaseComplete(itemID, cost). In this manner, an incomplete transaction can be identified when an item is added to an electronic shopping cart without a subsequent purchase of the item (e.g., payment for the item). For instance, the event log can be searched to determine that the transaction event was initiated (e.g., item added to shopping cart) as indicated by an event in the event log but not completed as indicated by a lack of subsequent event in the log (e.g., purchase item) and, as such, determine an incomplete transaction exists. Such indicators are examples only and not intended to limit the scope of embodiments herein.

When completion of the transaction is not identified, the transaction can be designated as an incomplete transaction. Upon determining an incomplete transaction, that is, a transaction that was not completed, a determination can be made as to whether the incomplete transaction is associated with an error or crash occurring in connection with a mobile application. In some cases, a session identifier is used to make the determination as to whether the incomplete transaction is associated with the application error. For instance, a session identifier associated with the incomplete transaction can be referenced and used to search an error log to determine if the session identifier corresponds with an application error. If the incomplete transaction is associated with an application error, a correlation between the application error and the incomplete transaction can be designated.

In another implementation, an error or crash associated with an application is initially identified. In some cases, a specific error identifier might be searched for in an event log to identify a particular error. Upon determining an error associated with an application, a determination can be made as to whether the error corresponds with an incomplete transaction. In some cases, a session identifier is used to make the determination as to whether the application error is associated with the incomplete transaction. For example, a session identifier associated with the application error can be referenced and used to search a transaction log to determine if the session identifier corresponds with an incomplete transaction. If the application error is associated with an incomplete transaction, a correlation between the application error and the incomplete transaction can be designated.

Upon determining an application error correlates with the incomplete transaction, the transaction data and/or performance data associated therewith can be used to determine a transaction attribute(s), such as a transaction impact associated with the error. In some cases, the analytics server 218 might provide application data, such as transaction data and/or performance data, as a transaction attribute to an application developer or provider (e.g., at the developer computing device 102 of FIG. 1). In other cases, application data might be used to determine or calculate a transaction attribute(s). Although the analytics server 218 is generally discussed as generating transaction attributes, any component can determine transaction attributes, including the client device 208.

As previously described, a transaction attribute refers to a characteristic, quality, or feature used to indicate or measure some component of data related to a transaction or set of transactions (e.g., an incomplete transaction or purchase). Transaction attributes are generally determined in order to provide information related to an incomplete transaction or set of incomplete transactions corresponding with application performance, such as an application error(s). As such, an application developer can utilize the information in a manner deemed suitable to the developer. For instance, the developer may recognize a monetary amount lost due to a particular type of application error and, in response, proceed with immediate modifications to prevent or reduce the subsequent occurrence of the error.

Examples of transaction attributes include an item identifier(s) identifying a specific item(s) associated with an incomplete purchase, an amount of money associated with an item or set of items for an incomplete purchase, a number of items associated with an incomplete purchase, an error identifier identifying an error associated with an incomplete transaction, a quantity of errors (e.g., a specific type of error) associated with incomplete transactions within a time period, a location of a client device at the time of an application error, etc. Another example of a transaction attribute may be an indication of abandonment of a transaction (e.g., a purchase transaction) based on presentation of a particular cost, such as a shipping cost. Such a transaction attribute can be determined, for instance, based on a time duration occurring between a presentation of a shipping cost and abandonment of a shopping cart. Abandonment of the shopping cart may be determined in any number of manners, such as termination of a session, removal of the item from the shopping cart, etc.

Figure 3:
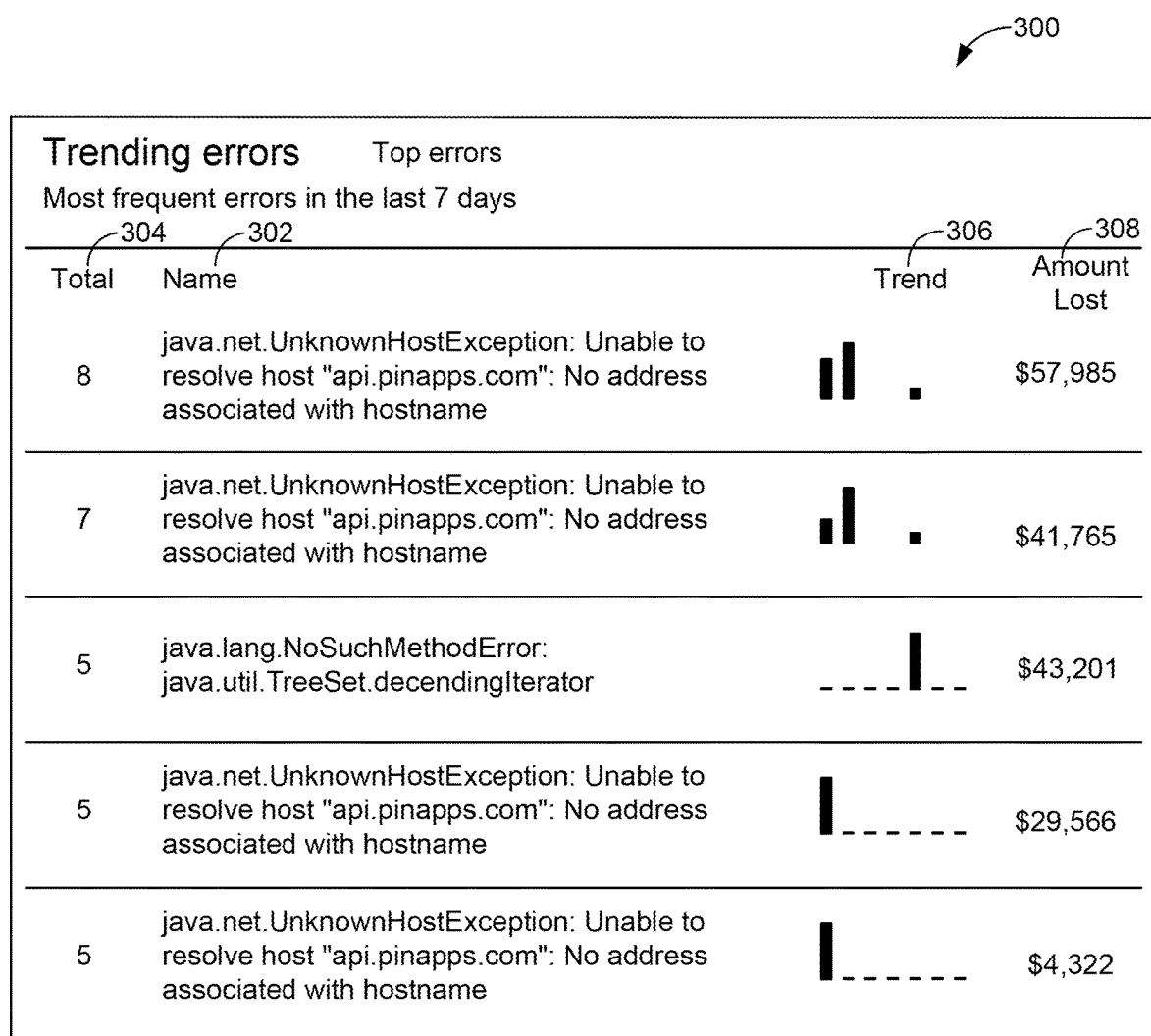
FIG. 3 illustrates an exemplary user interface presenting errors associated with incomplete purchases, in accordance with embodiments of the present invention.

In some cases, application data can be aggregated together to generate a transaction attribute. In this regard, application data provided via any number of mobile devices can be aggregated and used to generate a transaction attribute. For example, for sessions associated with a particular application (or set of applications) and occurring within a particular time period, a quantity of matching error identifiers can be calculated to identify a number of occurrences of each error that resulted in an incomplete transaction. By way of example, and with reference to FIG. 3, FIG. 3 illustrates a set of errors 300 correlating with incomplete transactions in association with an application. As shown in FIG. 3, the set of errors 300 includes the most frequent errors occurring in the last seven days. For each error identifier 302, a total number of error occurrences 304 is provided, as well as the trend 306 associated with the error during the seven day duration and the monetary amount lost 308 associated with the error during the seven day duration (e.g., items dropped or lost from shopping cart upon error). Although not illustrated, it is contemplated that any amount of type of data associated with the errors could also be calculated and provided to the user. For example, the uncollected monetary amount, number of unpurchased items, indications of the unpurchased items, or the like could be provided in connection with the errors and/or used to rank the errors. As further examples, a geographical location of the mobile devices, a version of the application, or other device or application data could also be presented in connection with the errors to illustrate other information or trends related to the application errors.

As another example, for sessions associated with a particular application (or set of applications) and occurring within a particular time period, transaction data associated with incomplete purchases can be aggregated. For instance, item identifiers, monetary amount associated with unpurchased items, etc. can be aggregated to identify a transaction impact associated with an error or set of errors. As can be appreciated, in some cases, transaction data associated with a particular error identifier can be aggregated together to generate a transaction attribute. That is, incomplete purchases associated with a particular error identifier can be aggregated to calculate, for instance, the amount of money lost due to a specific type of application crash.

Upon generating a set of one or more transaction attributes, a set of transaction attributes can then be communicated to an application developer or provider so that the application developer can utilize such information to optimize and/or resolve issues associated with an application(s). For example, the analytics server 218 may obtain application data indicating transactions and/or performance in relation to a particular mobile application running on any number of mobile devices. The captured application data can be analyzed to generate transaction attributes that indicate impacts of incomplete purchases based on application errors. Such transaction attributes can be reported to the application developer or provider (e.g., via developer computing device 102 of FIG. 1 or other device accessible by a developer) such that the application developer is informed in relation to transactions and/or performance associated with the application. In various implementations, the analytics server 218 may report transaction attributes related to a specific application, a set of applications (e.g., applications provided by a specific application developer), client devices having a particular application installed thereon, etc.

As can be appreciated, transaction attributes can be provided to the application developer in any manner. In one embodiment, for example, the transaction attributes can be accessed via a web browser or application operating at a computing device of an application developer. In this regard, a dashboard can be presented to the developer including analytics data that indicate errors associated with incomplete transactions. In some cases, a notification can be provided to a developer upon detection of a transaction attribute or set of transaction attributes. For example, a developer may be notified of a single error and transaction attribute(s) associated therewith. As another example, a developer may be notified of a transaction attribute(s) when the attribute exceeds a threshold, such as, for instance, a monetary amount, quantity, etc.

Transaction attributes, or indications thereof, may additionally or alternatively be provided to a user of the client device. For example, upon detection of a transaction attribute, a user may be notified of the error occurrence. In some cases, the user may be provided with a notification communicated to the client device, which includes a link to refill an electronic shopping cart with an item(s) previously included in a shopping cart but lost due to the occurrence of the error.

Embodiments of the present invention may be implemented via a cloud computing platform. In particular, a scalable implementation can be implemented using a cloud computing platform that comprises components described herein in a distributed manner. A cloud computing platform may span wide geographic locations, including countries and continents. The cloud computing platform may include nodes (e.g., computing devices, processing units, or blades in a server rack) that are allocated to run one or more portions of the components of the present invention. Components may be partitioned into virtual machines or physical machines that concurrently support functional portions such that each functional portion is able to run on a separate virtual machine.

Figure 4:
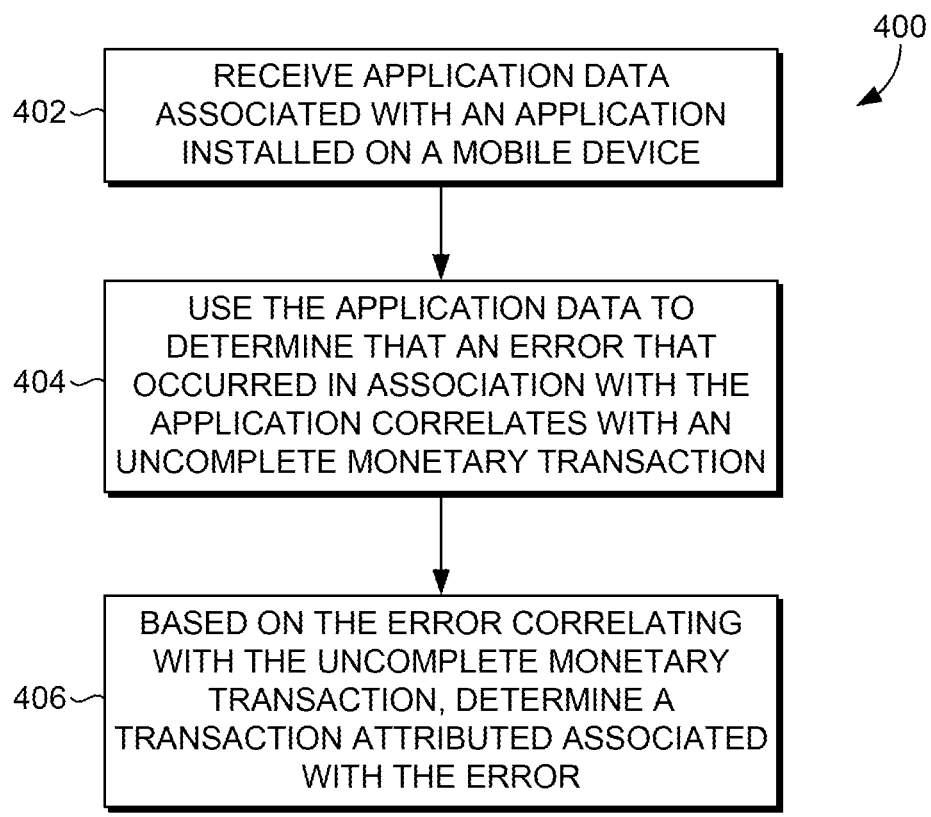
FIG. 4 is a flow diagram showing a method for facilitating tracking incomplete purchases in correlation with application errors in accordance with an embodiment of the present invention.

With reference now to FIG. 4 a flow diagram is provided that illustrates a method 400 for facilitating tracking incomplete purchases in correlation with application errors in accordance with an embodiment of the present invention. Such an implementation may be performed at an analytics server, such as analytics server 218 of FIG. 2. Initially, at block 402, application data associated with an application installed on a mobile device is received. Application data can include, for instance, performance data, transaction data, session identifiers, or the like. At block 404, the application data is used to determine that an error that occurred in association with the application installed on the mobile device correlates with an incomplete monetary transaction initiated via the application. Based on the correlation between the incomplete monetary transaction and the error, a transaction attribute associated with the error is determined, as indicated at block 406. The transaction attribute may be any characteristic or measure of information related to a transaction or set of transactions (e.g., incomplete transactions). Examples of transaction attributes include an item identifier(s) identifying a specific item(s) associated with an incomplete purchase, an amount of money associated with an item or set of items for an incomplete purchase, a number of items associated with an incomplete purchase, an error identifier identifying an error associated with an incomplete transaction, a quantity of errors (e.g., a specific type of error) associated with incomplete transactions within a time period, a location of a client device at the time of an application error, etc.

Figure 5:
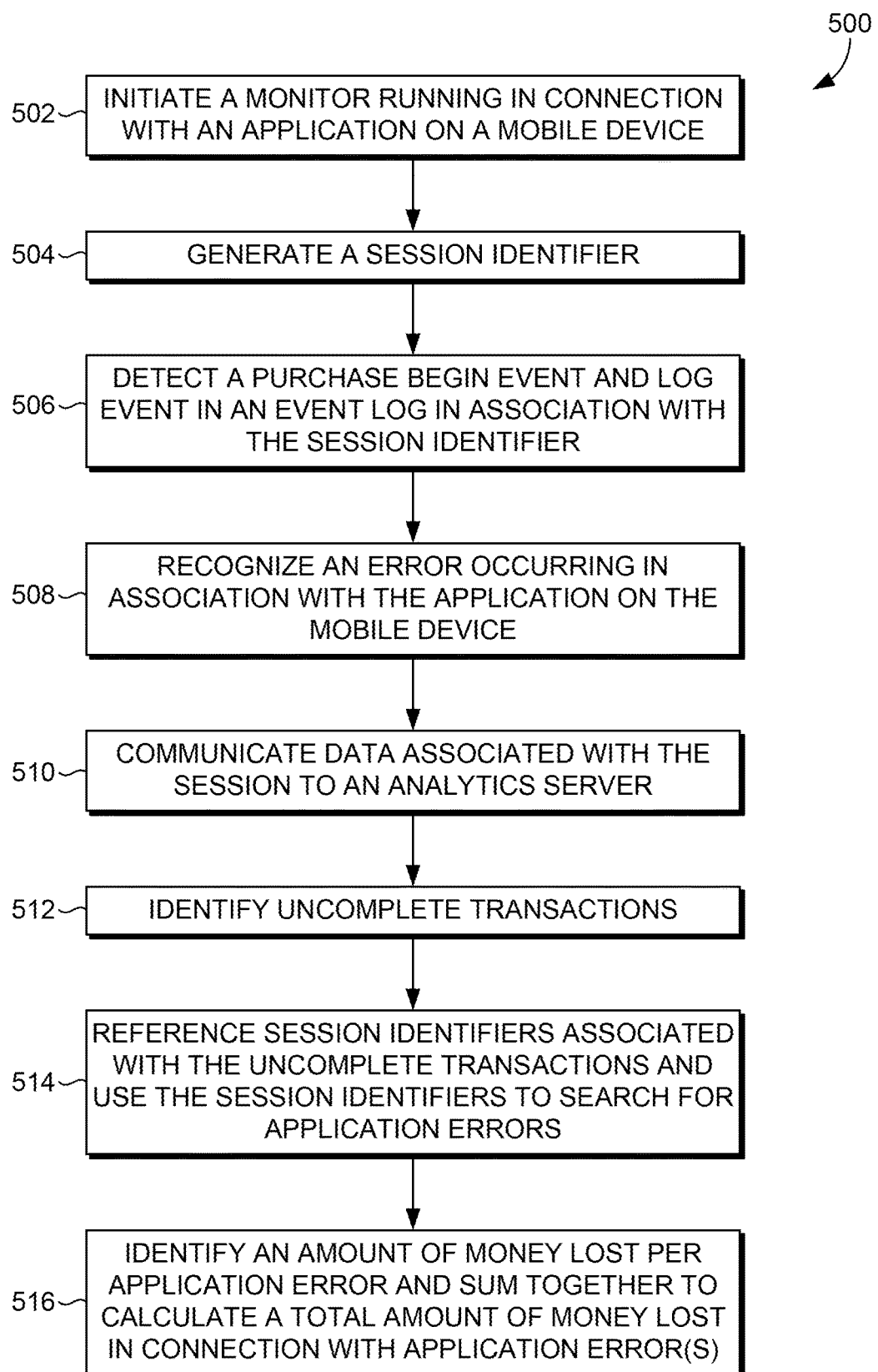
FIG. 5 is a flow diagram showing another method for facilitating tracking incomplete purchases in correlation with application errors in accordance with an embodiment of the present invention.

With reference now to FIG. 5, a flow diagram is provided that illustrates a method 500 for facilitating tracking incomplete purchases in correlation with application errors in accordance with an embodiment of the present invention. Initially, at block 502, a monitor running in connection with an application on a mobile device is initiated. A monitor may be automatically initiated upon initialization of the application. At block 504, a session identifier is generated. Subsequently, at block 506, a purchase begin event is detected and logged in an event log in association with the session identifier. At block 508, an error occurs in association with the application on the mobile device. Data associated with the session are communicated to an analytics server, as indicated at block 510. At block 512, incomplete transactions are identified. Incomplete transactions can be identified at any time and in association with any collected data. For instance, such an identification may occur upon receiving the data, upon a lapse of a predetermined time period, etc. for data collected within a predetermined time period. Session identifiers associated with the incomplete transactions are referenced and used to search if associated with an application error, as indicated at block 514. In some cases, a specific error may be searched for, while in other cases, any errors occurring in connection with the application may be identified. At block 516, an amount of money lost per application error is identified and summed together to calculate a total amount of money lost in connection with an application error(s).

Figure 6:
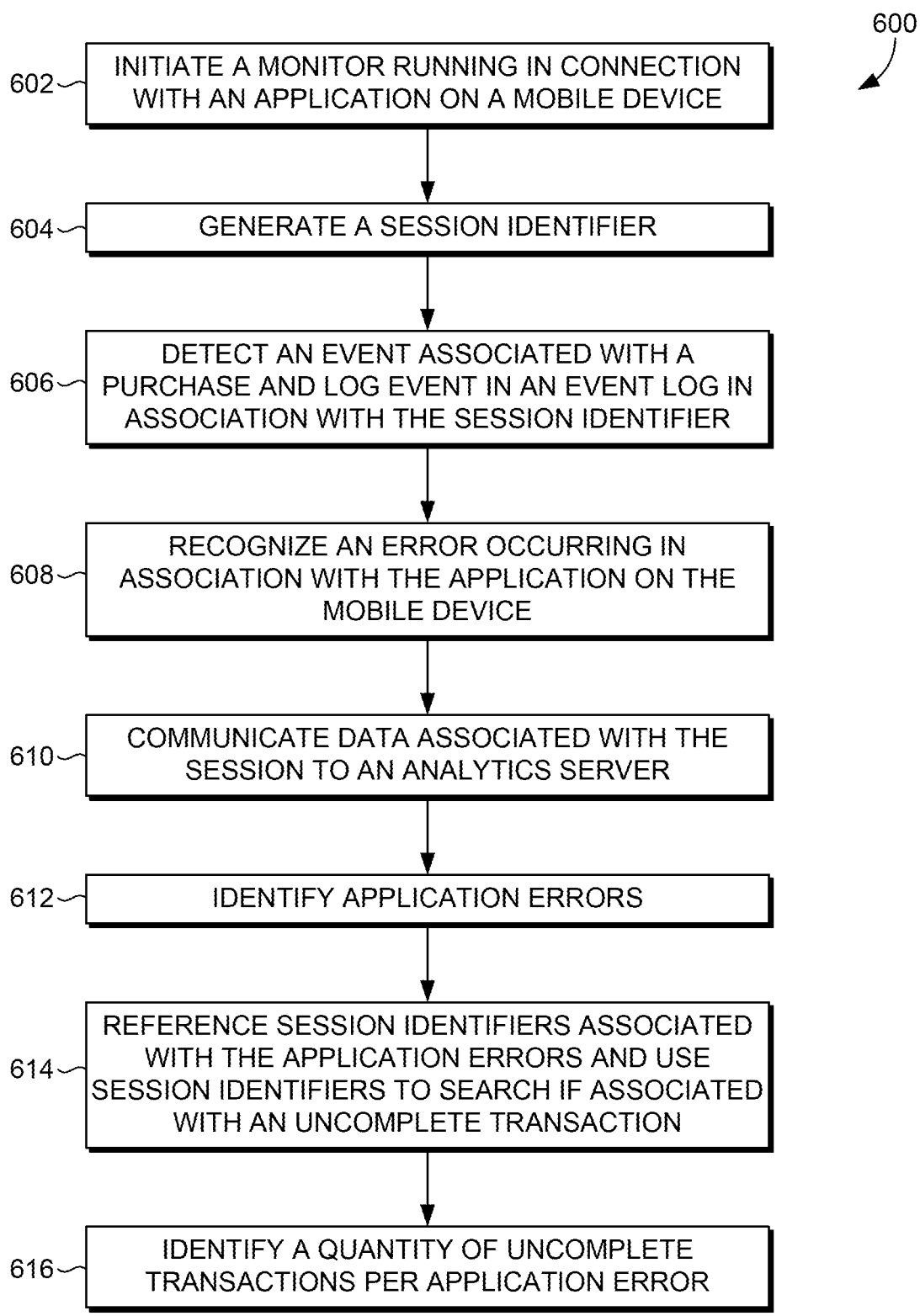
FIG. 6 is a flow diagram showing another method for facilitating tracking incomplete purchases in correlation with application errors in accordance with an embodiment of the present invention.

Turning now to FIG. 6, a flow diagram is provided that illustrates a method 600 for facilitating tracking incomplete purchases in correlation with application errors in accordance with an embodiment of the present invention. Initially, at block 602, a monitor running in connection with an application on a mobile device is initiated. A monitor may be automatically initiated upon initialization of the application. At block 604, a session identifier is generated. Subsequently, at block 606, an event associated with a purchase is detected and logged in an event log in association with the session identifier. At block 608, an error occurs in association with the application on the mobile device. Data associated with the session are communicated to an analytics server, as indicated at block 610. At block 612, application errors are identified. In some cases, a specific error may be searched for, while in other cases, any errors occurring in connection with the application may be identified. Application errors can be identified at any time and in association with any collected data. For instance, such an identification may occur upon receiving the data, upon a lapse of a predetermined time period, etc. for data collected within a predetermined time period. Session identifiers associated with the application errors are referenced and used to search if associated with an incomplete transaction, as indicated at block 614. At block 616, a quantity of incomplete transactions per application error is identified. The quantity of incomplete transactions on a per error basis can be provided to the developer, for example, as illustrated in FIG. 3.

Having described an overview of embodiments of the present invention, an exemplary operating environment in which embodiments of the present invention may be implemented is described below in order to provide a general context for various aspects of the present invention. Referring to FIG. 7 in particular, an exemplary operating environment for implementing embodiments of the present invention is shown and designated generally as computing device 700. The computing device 700 is but one example of a suitable computing environment and is not intended to suggest any limitation as to the scope of use or functionality of embodiments of the invention. Neither should the computing device 700 be interpreted as having any dependency or requirement relating to any one component nor any combination of components illustrated.

Embodiments of the invention may be described in the general context of computer code or machine-useable instructions, including computer-useable or computer-executable instructions such as program modules, being executed by a computer or other machine, such as a personal data assistant or other handheld device. Generally, program modules include routines, programs, objects, components, data structures, and the like, and/or refer to code that performs particular tasks or implements particular abstract data types. Embodiments of the invention may be practiced in a variety of system configurations, including, but not limited to, hand-held devices, consumer electronics, general-purpose computers, more specialty computing devices, and the like. Embodiments of the invention may also be practiced in distributed computing environments where tasks are performed by remote-processing devices that are linked through a communications network.

Figure 7:
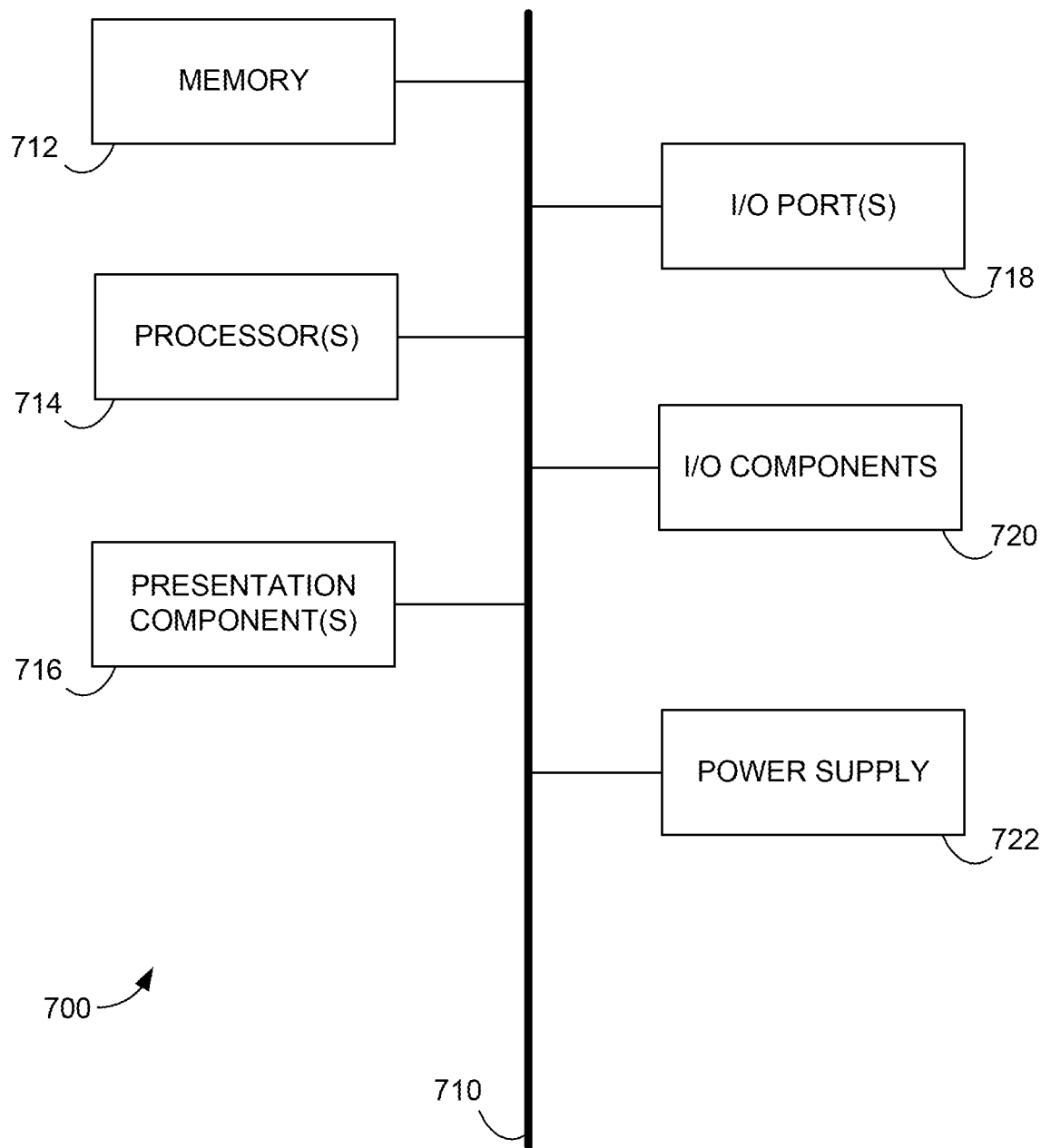
FIG. 7 is a block diagram of an exemplary computing environment suitable for use in implementing embodiments of the present invention.

With continued reference to FIG. 7, the computing device 700 includes a bus 710 that directly or indirectly couples the following devices: a memory 712, one or more processors 714, one or more presentation components 716, one or more input/output (I/O) ports 718, one or more I/O components 720, and an illustrative power supply 722. The bus 710 represents what may be one or more busses (such as an address bus, data bus, or combination thereof). Although the various blocks of FIG. 7 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors 714 that read data from various entities such as memory 712 or I/O components 720. Presentation component(s) 716 present data indications to a user or other device. Exemplary presentation components include a display device, speaker, printing component, vibrating component, etc. I/O ports 718 allow computing device 700 to be logically coupled to other devices including I/O components 720, some of which may be built in. Illustrative I/O components 720 include a microphone, joystick, game pad, scanner, hard/soft button, touch screen display, etc.

Figure 8:
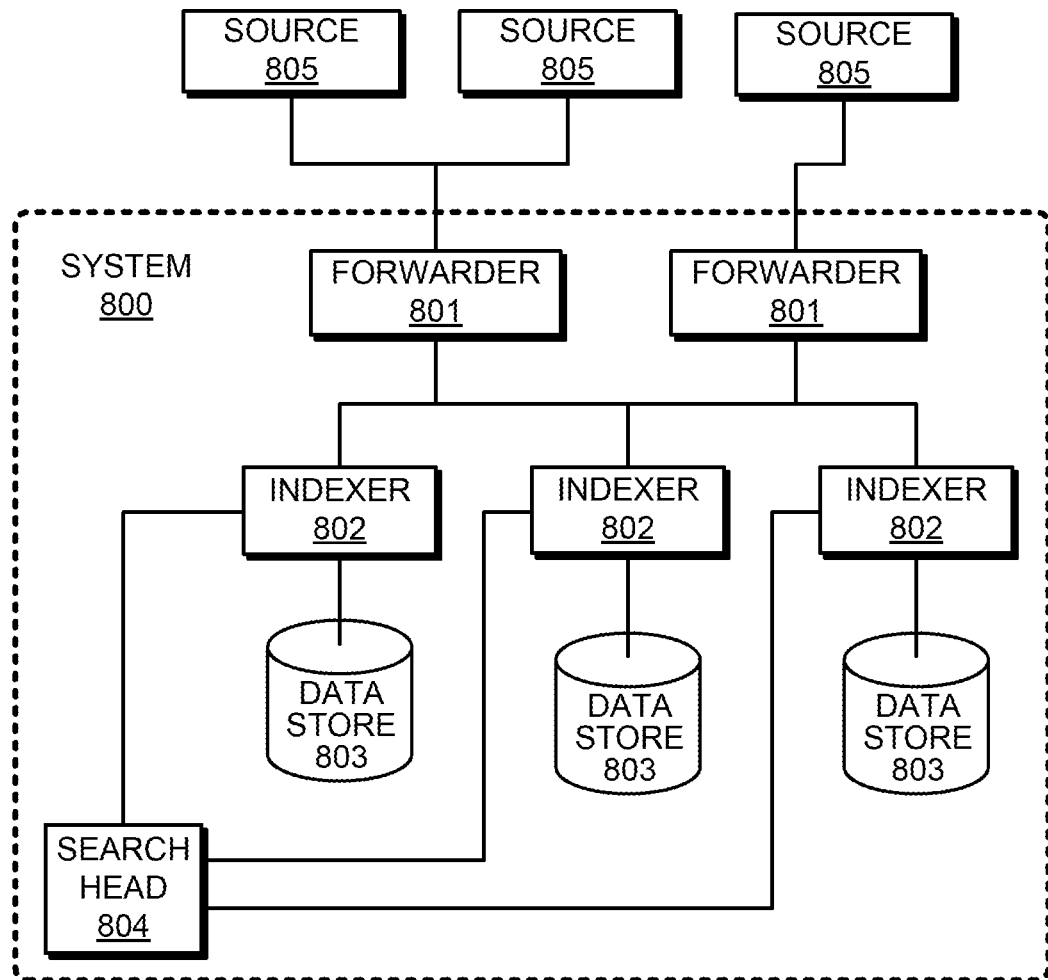
FIG. 8 presents a block diagram of an event-processing system in accordance with the disclosed embodiments.

As described above, functionality described in association with an analytics server can be performed by an event-based system, such as the SPLUNK® ENTERPRISE system produced by Splunk Inc. of San Francisco, California. FIG. 8 presents a block diagram of an exemplary event-processing system 800, similar to the SPLUNK® ENTERPRISE system. System 800 includes one or more forwarders 801 that collect data obtained from a variety of different data sources 805, and one or more indexers 802 that store, process, and/or perform operations on this data, wherein each indexer operates on data contained in a specific data store 803. These forwarders and indexers can comprise separate computer systems in a data center, or may alternatively comprise separate processes executing on various computer systems in a data center.

During operation, the forwarders 801 identify which indexers 802 will receive the collected data and then forward the data to the identified indexers. Forwarders 801 can also perform operations to strip out extraneous data and detect timestamps in the data. The forwarders next determine which indexers 802 will receive each data item and then forward the data items to the determined indexers 802.

Note that distributing data across different indexers facilitates parallel processing. This parallel processing can take place at data ingestion time, because multiple indexers can process the incoming data in parallel. The parallel processing can also take place at search time, because multiple indexers can search through the data in parallel.

System 800 are further described in "Exploring Splunk Search Processing Language (SPL) Primer and Cookbook" by David Carasso, CITO Research, 2012, and in "Optimizing Data Analysis With a Semi-Structured Time Series Database" by Ledion Bitincka, Archana Ganapathi, Stephen Sorkin, and Steve Zhang, SLAML, 2010, each of which is hereby incorporated herein by reference in its entirety for all purposes. Although system 800 is described as one implementation for performing analytics functionality, any type of system can be implemented and is not limited herein.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computer-implemented method comprising:
providing, at a developer device, a graphical user interface configured to present crash data associated with crashes of a mobile application on mobile devices, the crashes having occurred during user transactions conducted with the mobile application, the crash data comprising:
a list of crash types of the crashes;
a first transaction attribute associated with the crashes and generated by aggregating application data of the mobile application provided from the mobile devices; and
a second transaction attribute indicating a transaction status, of one or more of the user transactions, determined to correlate with a first set of the crashes, wherein the second transaction attribute comprises a monetary amount associated with a set of one or more items determined to be abandoned in association with the first set of the crashes; and
modifying the mobile application, to reduce subsequent occurrences of an error, based on analysis of at least a portion of the crash data.

2. The method of claim 1, wherein the first transaction attribute comprises a graphical depiction of a trend over time of a number of occurrences of a set of the crashes of a particular one of the crash types.

3. The method of claim 1, wherein the graphical user interface is configured to present each of the crash types in association with a corresponding graphical depiction of a trend over time of a number of occurrences of a corresponding set of the crashes of the crash type, wherein the first transaction attribute is one of the graphical depictions.

4. The method of claim 1, wherein crash types within the list of crash types are ranked based on a determined monetary impact associated with each of the crash types.

5. The method of claim 1, wherein the transaction status is a monetary transaction determined to be incomplete based on a lack of a subsequent completion event.

6. The method of claim 1, wherein the graphical user interface is configured to present the list of crash types in association with, for each of the crash types, a corresponding one of a set of a first transaction attributes including the first transaction attribute.

7. The method of claim 1, wherein the graphical user interface is configured to present the list of crash types as a list of trending crash types comprising a list of most frequent crashes over a particular duration of time.

8. The method of claim 1, wherein the list of crash types is associated with a set of the crashes determined to correspond with incomplete monetary transactions, the incomplete monetary transactions identified based on a detected event indicating initiation of a monetary transaction and a detected lack of a subsequent event indicating completion of the monetary transaction within a corresponding session.

9. The method of claim 1, wherein the graphical user interface is configured to present each of the crash types in association with a corresponding graphical depiction of a trend over time of a number of occurrences of a corresponding set of the crashes of the crash type.

10. A system for crash monitoring, the system comprising:
one or more data processors; and
one or more computer-readable storage media containing instructions which when executed on the one or more data processors, cause the one or more processors to perform operations including:
providing, at a developer device, a graphical user interface configured to present crash data associated with crashes of a mobile application on mobile devices, the crashes having occurred during user transactions conducted with the mobile application, the crash data comprising:
a list of crash types of the crashes;
a first transaction attribute associated with the crashes and generated by aggregating application data of the mobile application provided from the mobile devices; and
a second transaction attribute indicating a transaction status, of one or more of the user transactions, determined to correlate with a first set of the crashes, wherein the second transaction attribute comprises a monetary amount associated with a set of one or more items determined to be abandoned in association with the first set of the crashes; and
modifying the mobile application, to reduce subsequent occurrences of an error, based on user analysis of at least a portion of the crash data.

11. The system of claim 10, wherein the first transaction attribute comprises a graphical depiction of a trend over time of a number of occurrences of a set of the crashes of a particular one of the crash types.

12. The system of claim 10, wherein the graphical user interface is configured to present each of the crash types in association with a corresponding graphical depiction of a trend over time of a number of occurrences of a corresponding set of the crashes of the crash type, wherein the first transaction attribute is one of the graphical depictions.

13. The system of claim 10, wherein crash types within the list of crash types are ranked based on a determined monetary impact associated with each of the crash types.

14. The system of claim 10, wherein the transaction status is a monetary transaction determined to be incomplete based on a lack of a subsequent completion event.

15. The system of claim 10, wherein the graphical user interface is configured to present the list of crash types in association with, for each of the crash types, a corresponding one of a set of a first transaction attributes including the first transaction attribute.

16. The system of claim 10, wherein the graphical user interface is configured to present the list of crash types as a list of trending crash types comprising a list of most frequent crashes over a particular duration of time.

17. One or more computer-storage media storing computer-executable instructions that, when executed by a computing device, perform a method for crash monitoring, the method comprising:
providing, at a developer device, a graphical user interface configured to present crash data associated with crashes of a mobile application on mobile devices, the crashes having occurred during user transactions conducted with the mobile application, wherein at least a portion of the crash data is used for modifying the mobile application to reduce subsequent occurrences of an error, the crash data comprising:
a list of crash types of the crashes;
a first transaction attribute associated with the crashes and generated by aggregating application data of the mobile application provided from the mobile devices; and
a second transaction attribute indicating a transaction status, of one or more of the user transactions, determined to correlate with a first set of the crashes, wherein the second transaction attribute comprises a monetary amount associated with a set of one or more items determined to be abandoned in association with the first set of the crashes; and
modifying the mobile application, to reduce subsequent occurrences of an error, based on user analysis of at least a portion of the crash data.

18. The one or more computer-storage media of claim 17, wherein the second transaction attribute indicates that the transaction status of a corresponding one of the one or more user transactions is an incomplete monetary transaction.

19. The one or more computer-storage media of claim 17, wherein the list of crash types is associated with a set of the crashes determined to correspond with incomplete monetary transactions, the incomplete monetary transactions identified based on a detected event indicating initiation of a monetary transaction and a detected lack of a subsequent event indicating completion of the monetary transaction within a corresponding session.

20. The one or more computer-storage media of claim 17, wherein the graphical user interface is configured to present each of the crash types in association with a corresponding graphical depiction of a trend over time of a number of occurrences of a corresponding set of the crashes of the crash type.

* * * * *